US008374260B2

(12) United States Patent
Schirmacher et al.

(10) Patent No.: US 8,374,260 B2
(45) Date of Patent: Feb. 12, 2013

(54) METHOD AND APPARATUS FOR IMPLEMENTING UPLINK TRANSMIT DIVERSITY IN A SWITCHED ANTENNA ORTHOGONAL FREQUENCY DIVISION MULTIPLEXING COMMUNICATION SYSTEM

(75) Inventors: Matthew S. Schirmacher, Lake in the Hills, IL (US); Frederick W. Vook, Schaumburg, IL (US); Wei Wu, Forest Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 861 days.

(21) Appl. No.: 12/489,004

(22) Filed: Jun. 22, 2009

(65) Prior Publication Data

US 2010/0322328 A1    Dec. 23, 2010

(51) Int. Cl.
 *H04K 1/10* (2006.01)
(52) U.S. Cl. ........ 375/260; 375/267; 375/299; 375/347; 455/517; 455/59; 455/63.1; 455/67.13; 455/69; 455/575.1; 455/101; 455/103; 455/115.1; 455/115.4
(58) Field of Classification Search ........... 455/517, 455/59, 63.1, 67.13, 69, 575.7, 101, 103, 455/115.1–115.4; 375/260, 267, 299, 347
See application file for complete search history.

(56) References Cited

U.S. PATENT DOCUMENTS

| | | | | |
|---|---|---|---|---|
| 7,610,024 | B2* | 10/2009 | Laroia et al. | 455/101 |
| 7,756,099 | B2* | 7/2010 | Tao et al. | 370/344 |
| 7,924,803 | B2* | 4/2011 | Tao et al. | 370/344 |
| 8,009,580 | B2* | 8/2011 | Tao et al. | 370/252 |
| 8,098,623 | B2* | 1/2012 | Ramesh et al. | 370/329 |

* cited by examiner

*Primary Examiner* — Daniel Washburn
*Assistant Examiner* — Rahel Guarino

(57) ABSTRACT

A method and a customer's wireless communication device are provided that perform uplink transmit diversity in a switched antenna OFDM communication system. A switching of antennas used by the customer's wireless communication device to transmit an uplink signal is restricted to switching time periods that comprise one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the customer's wireless communication device. The customer's wireless communication device then switches antennas used for uplink transmissions only during the switching time periods.

14 Claims, 7 Drawing Sheets

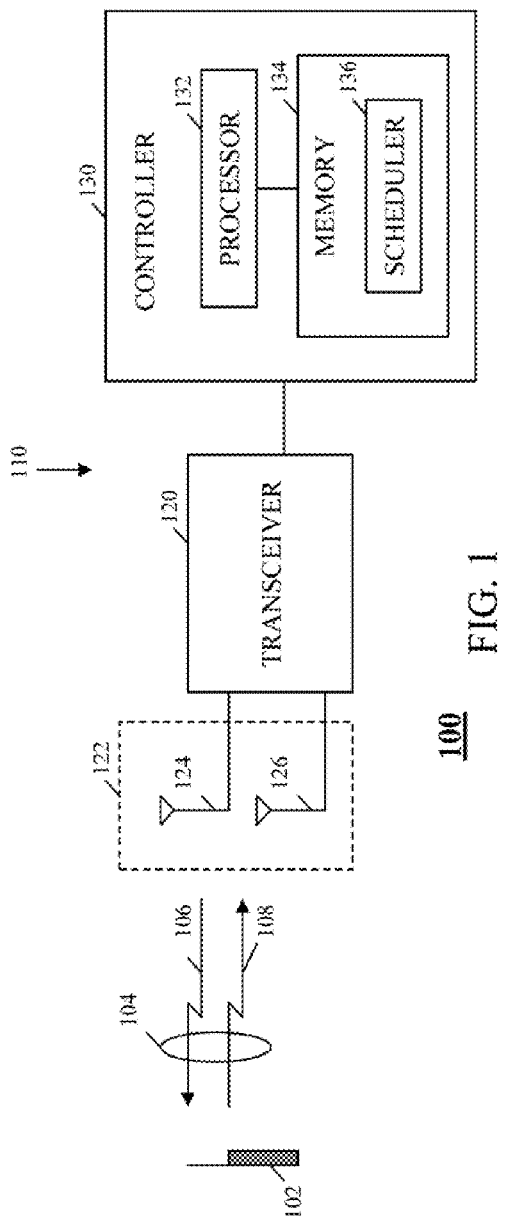
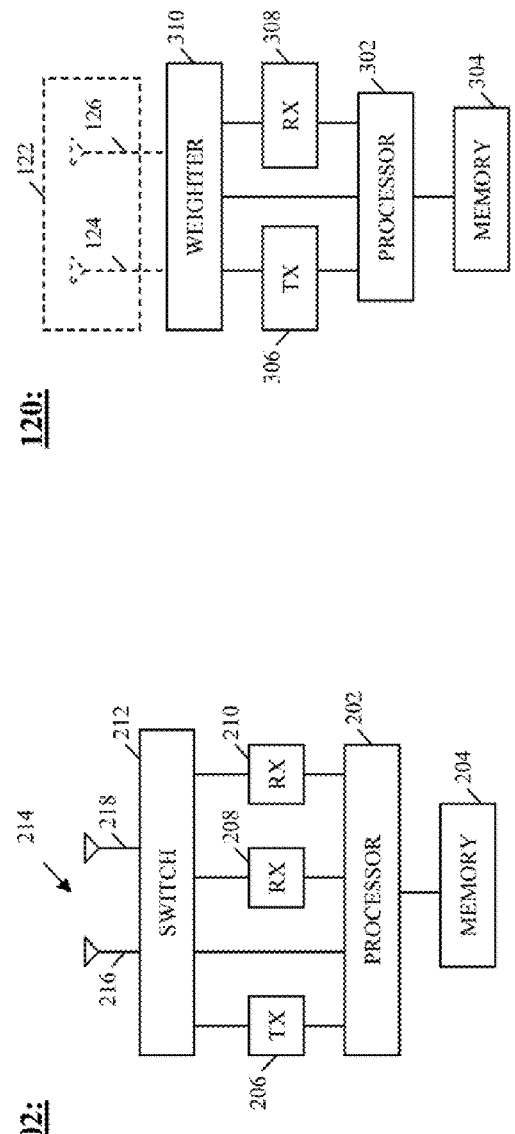
FIG. 1
FIG. 2
FIG. 3

METHOD AND APPARATUS FOR IMPLEMENTING UPLINK TRANSMIT DIVERSITY IN A SWITCHED ANTENNA ORTHOGONAL FREQUENCY DIVISION MULTIPLEXING COMMUNICATION SYSTEM

FIELD OF THE INVENTION

The present invention relates generally to Orthogonal Frequency Division Multiplexing (OFDM) communication systems, and, in particular, to uplink transmit diversity in a switched antenna OFDM communication system.

BACKGROUND OF THE INVENTION

The IEEE (Institute of Electrical and Electronics Engineers) 802.16 standards propose using an Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-carriers, wherein groups of sub-carriers are arranged in logical frequency sub-bands (not necessarily contiguous in frequency), each sub-band comprising multiple orthogonal frequency sub-carriers, that are transmitted simultaneously. A user may then be assigned one or more of the frequency sub-bands for an exchange of user information, thereby permitting multiple users to transmit simultaneously on the different sub-bands. These sub-bands are orthogonal to each other, and thus inter-user and intra-cell interference is minimized.

In order to provide more efficient use of the channel bandwidth, a radio access network (RAN) may transmit and receive data using an antenna array comprising multiple antennas. In the switched antenna system described herein, a customer's premises equipment (CPE), in turn receives and transmits data using one or more of multiple antennas. In an OFDMA system, a serving RAN may beamform a downlink signal for transmission to a CPE via an antenna array and over an associated sub-band. In order to beamform the signal, the RAN maintains a set of weights in association with the CPE and each antenna of the antenna array. When the RAN transmits to the CPE, the RAN applies an appropriate weight, of the set of weights, to the signal applied to each element of the array. In order to determine the set of weights for the CPE, the RAN measures uplink channel conditions in association with the CPE. That is, for any given measuring period, such as a Transmission Time Interval (TTI) (also known as a sub-frame), the CPE transmits a pre-determined symbol to the RAN in a sub-band allocated to the CPE by the RAN. Based on a comparison of the symbol received to the symbol that the RAN knows was transmitted, the RAN is able to estimate channel conditions for the CPE in the allocated sub-band and determine a set of weights for beamforming a downlink transmission to the CPE in the sub-band.

When a multi-antenna CPE implements a switched antenna system for transmit diversity, the channel conditions may vary depending upon which antenna, of the multiple antennas of the CPE, is used by the CPE to transmit to the RAN. As a result, the beamforming implemented by the RAN may become sub-optimal when the CPE switches antennas subsequent to the channel sounding that was most recently used, by the RAN, to determine the beamforming weights.

Accordingly, there is a need for a method and apparatus for controlling switching of a switched antenna system at a CPE in an OFDM system such that the switching does not disrupt beamforming at a serving RAN.

BRIEF DESCRIPTION OF THE DRAWINGS

FIG. 1 is a block diagram of a wireless communication system in accordance with an embodiment of the present invention.

FIG. 2 is a block diagram of a user equipment in accordance with an embodiment of the present invention.

FIG. 3 is a block diagram of a transceiver in accordance with an embodiment of the present invention.

Figure 4:
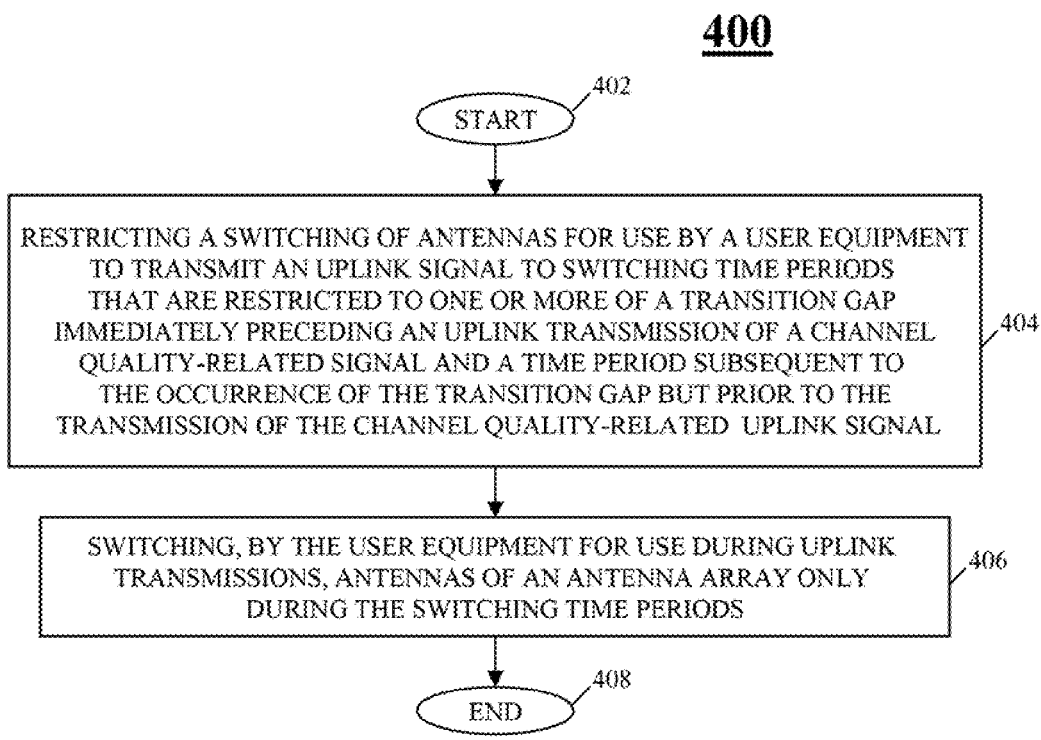
FIG. 4 is a logic flow diagram illustrating a method executed by the communication system of FIG. 1 in implementing an uplink transmit diversity scheme in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus for controlling switching of a switched antenna system at a customer's wireless communication device in an Orthogonal Frequency Division Multiplexing (OFDM) system such that the switching does not disrupt beamforming at a serving RAN, a method and a customer's wireless communication device are provided that perform uplink transmit diversity in a switched antenna OFDM communication system. A switching of antennas used by the customer's wireless communication device to transmit an uplink signal is restricted to switching time periods that comprise one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the customer's wireless communication device. The customer's wireless communication device then switches antennas used for uplink transmissions only during the switching time periods.

Generally, an embodiment of the present invention encompasses a method for providing uplink transmit diversity in a switched antenna OFDM communication system. The method includes restricting a switching of antennas for use by a customer's wireless communication device to transmit an uplink signal to switching time periods comprising one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the user equipment, and switching, by the customer's wireless communication device, from use of a first antenna of a plurality of antennas to use of a second antenna of the plurality of antennas for uplink transmissions only during the switching time periods.

Another embodiment of the present invention encompasses a customer's wireless communication device that is capable of operating in an OFDM communication system and that includes multiple antennas, a switching device coupled to the multiple antennas, and a processor that is coupled to the switching device. The processor is configured to cause the switching device to switch from use of a first antenna of the multiple antennas to use of a second antenna of the multiple antennas for uplink transmissions only during the switching time periods, wherein the switching time periods are restricted to time periods comprising one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the user equipment.

The present invention may be more fully described with reference to FIGS. 1-7. FIG. 1 is a block diagram of a wireless communication system 100 in accordance with an embodiment of the present invention. Communication system 100 includes a customer's wireless communication device 102, for example, a customer's premises equipment or any type of multi-antenna user equipment (hereinafter collectively referred to as "UEs") such as but not limited to a multi-antenna cellular telephone, radio telephone, or personal digital assistant (PDA) or digital terminal equipment (DTE), such as a laptop computer, with radio frequency (RF) capabilities. Communication system 100 further includes a Radio Access Network (RAN) 110 that provides communication services to UE 102 via an air interface 104. RAN 110 includes a transceiver 120, such as a Node B, a Base Transceiver Station (BTS), or an Access Point (AP), in wireless communication with UE 102. RAN 110 may further include a network controller 130, such as a Radio Network Controller (RNC) or a Base Station Controller (BSC), coupled to the transceiver; however, in various embodiments of the invention the functionality of controller 130 may be implemented in transceiver 120 or other network elements of system 100 or may be distributed between transceiver 120 and the other network elements of system 100. Air interface 104 comprises a downlink (DL) 106 and an uplink (UL) 108. Each of DL 106 and UL 108 comprises multiple physical communication channels, including multiple control channels and multiple traffic channels.

Transceiver 120 is coupled to an antenna array 122 via a duplexer. Antenna array 122 comprises multiple antenna elements 124, 126 (two shown). By utilizing an antenna array to transmit signals to a UE located in a coverage area, such as a cell or sector serviced by the antenna array, RAN 110 is able to utilize a beamforming technique for the transmission of the signals. Controller 130 includes a processor 132, such as one or more microprocessors, microcontrollers, digital signal processors (DSPs), combinations thereof or such other devices known to those having ordinary skill in the art. The particular operations/functions of processor 132, and thus of controller 130, are determined by an execution of software instructions and routines that are stored in a respective at least one memory device 134 associated with the processor, such as random access memory (RAM), dynamic random access memory (DRAM), and/or read only memory (ROM) or equivalents thereof, that store data and programs that may be executed by the corresponding processor.

RAN 110 further includes a scheduler 136 that performs the scheduling functions described herein as being performed by the RAN, such as scheduling DL and UL data bursts for UEs serviced by the RAN, such as UE 102. As depicted in FIG. 2, scheduler 136 comprises data and software maintained in the at least one memory device 134 of controller 130 and implemented by processor 132 of the controller. However, in various other embodiments of the invention, scheduler 136 may be maintained in a memory of, and implemented by a processor of, transceiver 120, may comprise functions distributed between the transceiver and controller, or may be included in a network element separate from, and coupled to, the transceiver and the controller and comprising its own processor and at least one memory device.

Referring now to FIGS. 2 and 3, block diagrams are provided of UE 102 and transceiver 120, respectively, in accordance with an embodiment of the present invention. Each of UE 102 and transceiver 120 includes a respective processor 202, 302, such as one or more microprocessors, microcontrollers, digital signal processors (DSPs), combinations thereof or such other devices known to those having ordinary skill in the art. The particular operations/functions of processors 202, 302 and respectively thus of UE 102 and transceiver 120, are determined by an execution of software instructions and routines that are stored in a respective at least one memory device 204, 304 associated with the processor, such as random access memory (RAM), dynamic random access memory (DRAM), and/or read only memory (ROM) or equivalents thereof, that store data and programs that may be executed by the corresponding processor. UE 102 further includes a transmitter 206 and multiple receivers 208, 210 (two shown) that are each coupled to processor 202 of the UE. Transceiver 120 also includes a transmitter 206 and a receiver 208 that are each coupled to processor 302 of the transceiver.

UE 102 further includes an antenna array 214 that includes multiple antennas 216, 218 (two shown) that are each connectable to transmitter 206 and receiver 208 via a switching device 212, which switching device also is coupled to processor 202. Processor 202 is configured to cause switching device 212 to switch between the antennas 216, 218 of antenna array 214, that is, processor 202 controls switching device 212 such that UE 102 may implement switched transmit diversity by connecting only one of the multiple antennas 216, 218 to transmitter 206 via the switching device at any given time.

Transceiver 120 further includes a weighter 310 that is coupled to processor 302 and that is interposed between antenna array 122 and each of transmitter 306 and receiver 308. Weighter 310 weights signals applied to the multiple antenna elements 124, 126 of antenna array 122 based on channel quality-related uplink signaling received from UE 102 in order to beamform the signals for transmission to the UE over downlink 106. For example, in one embodiment of the present invention, the channel quality-related uplink signaling may be a known uplink signal, for example, a sounding signal, received from UE 102 and measured by RAN 110. In another embodiment of the present invention, the channel quality-related uplink signaling may comprise channel quality feedback provided to RAN 110 by UE 102 based on downlink signals measured by the UE.

Transceiver 120 further maintains, in at least one memory device 304 or weighter 310, a weighting matrix, which weighting matrix comprises multiple sets of weights and wherein each set of weights is associated with a UE and a combination of antenna elements for downlink DL to the UE, and provides the weights applicable to signals conveyed to each of the antenna elements for such a DL transmission. For each UE, the weights are determined by RAN 110 based on the channel quality-related uplink signaling received from the UE. That is, based on the channel quality-related uplink signaling, RAN 110 determines a channel response associated with the UE and computes a set of complex weights based on the determined channel response. The set of complex weights can be Eigen Beamforming (EBF) or Max-Ratio Transmission (MRT) vectors derived from the UL sounding signal measurements.

The embodiments of the present invention preferably are implemented within UE 102, transceiver 120, and controller 130, and more particularly with or in software programs and instructions stored in the respective at least one memory devices 204, 304, 134 and executed by respective processors 202, 302, 132. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102, transceiver 120, and controller 130. Based on the present disclosure, one skilled in the art will be readily capable of producing and implementing such software and/or hardware without undo experimentation. Furthermore, unless otherwise specified herein, the functions described herein as being performed by RAN 110 preferably are performed by scheduler 136, and more particularly by a processor associated with the scheduler based on programs and instructions stored in an at least one memory device associated with the scheduler.

Communication system 100 comprises an Orthogonal Frequency Division Multiplexing (OFDM) communication system that employs an OFDM modulation scheme for transmitting data over air interface 104, wherein a frequency channel, or bandwidth, is split into multiple frequency sub-bands, or resource blocks, during a given time period. Each sub-band comprises multiple orthogonal frequency sub-carriers over a given number of OFDM symbols, that are the physical layer channels over which traffic and signaling channels are transmitted in a TDM or TDM/FDM fashion. A communication session may be assigned a sub-band or a group or groups of sub-bands for an exchange of bearer information, thereby permitting multiple users to transmit simultaneously on the different sub-bands such that each user's transmission is orthogonal to the other users' transmissions.

In addition, communication system 100 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, a CDMA (Code Division Multiple Access) 1000 1XEV-DV communication system, a Wireless Local Area Network (WLAN) communication system as described by the IEEE 802.xx standards, for example, the 802.11a/ HiperLAN2, 802.11g, or 802.20 standards, or any of multiple proposed ultrawideband (UWB) communication systems.

In order to provide for switching of a switched antenna system at a UE, such as UE 102, such that the switching does not disrupt beamforming at a serving RAN, that is RAN 110, communication system 100 restricts such antenna switching to limited windows of time. More particularly, communication system 100 restricts a switching of uplink transmit antennas by a UE to occur only during one or more of a transition gap immediately preceding a transmission of a channel quality-related uplink signal, or subsequent to the occurrence of the transition gap but prior to the transmission of, the channel quality-related uplink signal, which channel quality-related uplink signal may be used by the serving RAN to update a channel response and antenna array weights associated with the UE.

Referring now to FIG. 4, a logic flow diagram is 400 is provided that illustrates an implementation of an uplink transmit diversity scheme in accordance with an embodiment of the present invention. FIG. 4 begins (402) when communication system 100, and in particular UE 102, restricts (404) a switching of antennas for use by the UE to transmit an uplink signal to switching time periods that are restricted to one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the user equipment. UE 102 then switches (406) antennas for use during uplink transmissions, for example, from use of a first antenna, such as antenna 216, of antenna array 214 to use of a second antenna, such as antenna 218, of the antenna array, only during the switching time periods. Logic flow diagram 400 then ends (408).

Figure 5A:
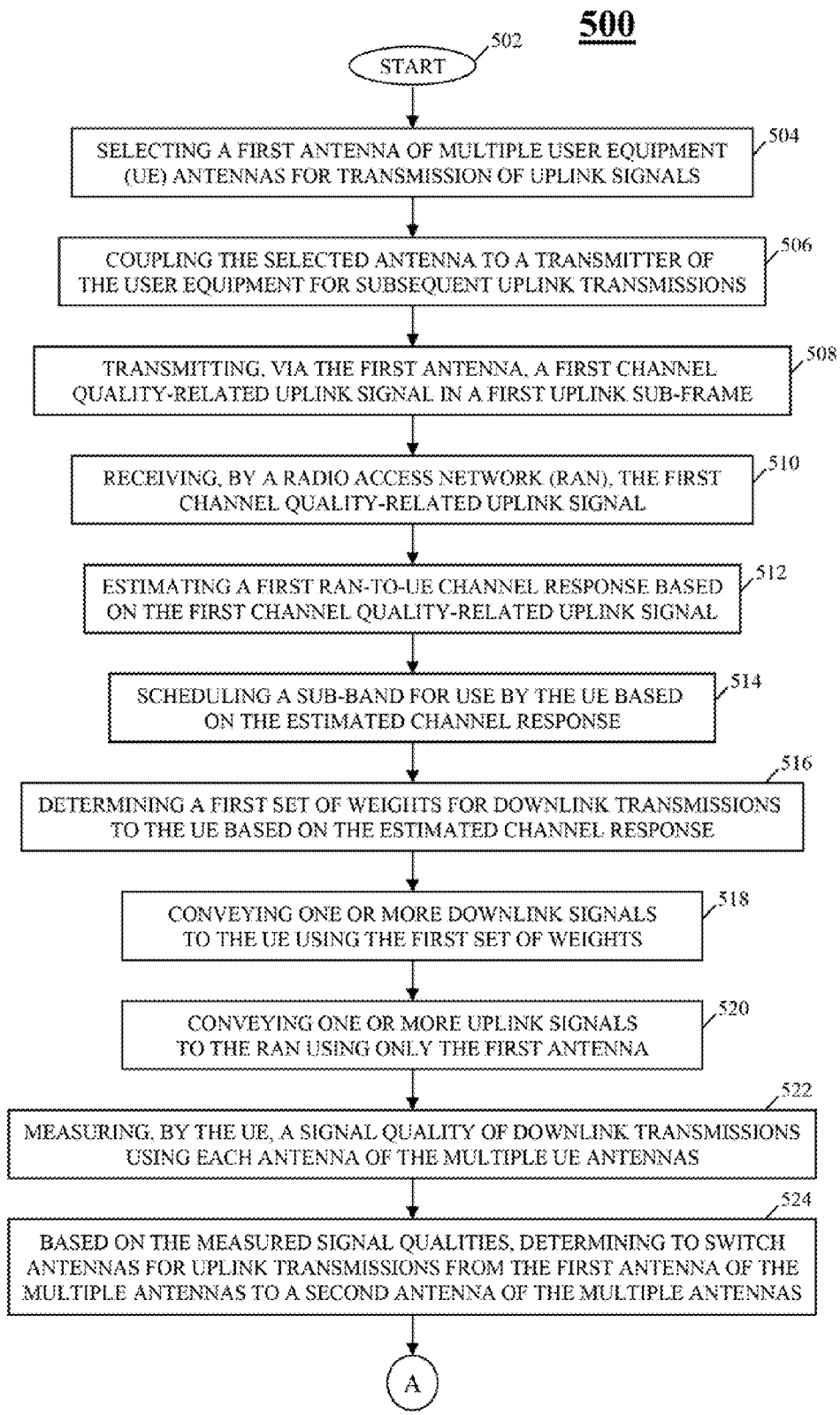
FIG. 5A is a logic flow diagram of a method executed by the communication system of FIG. 1 in implementing an uplink transmit diversity scheme in accordance with an embodiment of the present invention.
Figure 5B:
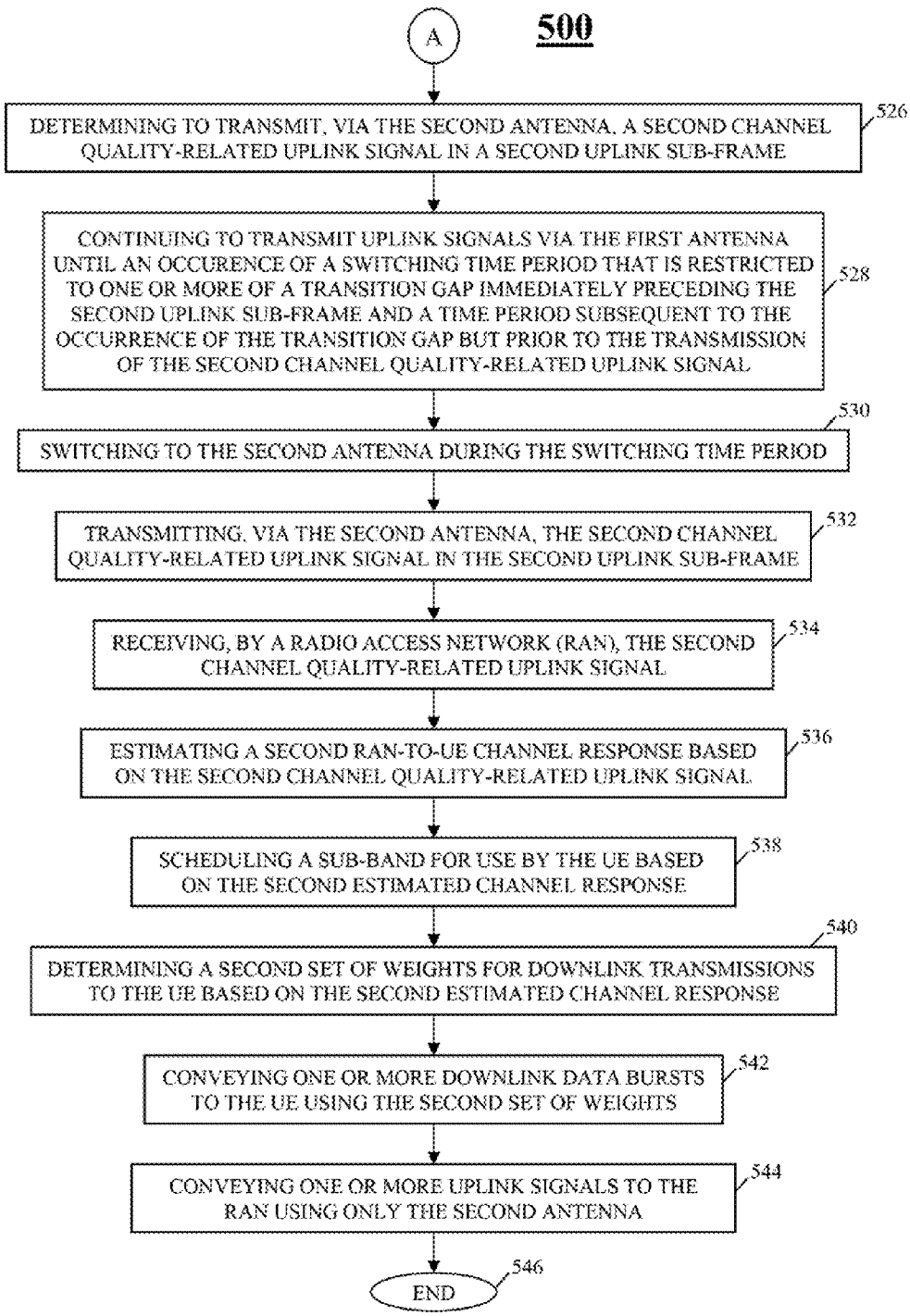
FIG. 5B is a continuation of the logic flow diagram of FIG. 5A illustrating a method executed by the communication system of FIG. 1 in implementing an uplink transmit diversity scheme in accordance with an embodiment of the present invention.

For example and referring now to FIGS. 5A and 5B, a logic flow diagram 500 is provided that further illustrates an implementation of the uplink transmit diversity scheme of FIG. 4 in accordance with an embodiment of the present invention. Logic flow diagram 500 begins (502) when UE 102 selects (504), via techniques known in the art, a first antenna, for example, antenna 216, of the multiple antennas 216, 218 of antenna array 214, for uplink transmission of signals to RAN 110. For example, UE 102 may select the antenna based on signals received by the UE from RAN 110, such as pilot signals, via each of the multiple antennas. UE 102 would then select an antenna that provides a best received signal quality, such as a best received signal strength, Carrier-to-interference-plus-noise-ratio (CINR), Signal-to-noise ratio (SNR), Bit Error Rate (BER), Frame Error Rate (FER), and so on.

UE 102 then couples (506), for subsequent uplink transmissions, the selected antenna 216 to transmitter 206 of the UE via switching device 212. Subsequent to coupling the selected antenna 216 to each of transmitter 206, UE 102 transmits (508) to RAN 110 via first antenna 216 and uplink 108, and the RAN receives (510) from the UE, a first channel quality-related uplink signal in a first uplink sub-frame during a first frame. The first channel quality-related uplink signal is associated with first antenna 216 and provides an indication of a condition of uplink 108 as between the first antenna and RAN 110.

Figure 6:
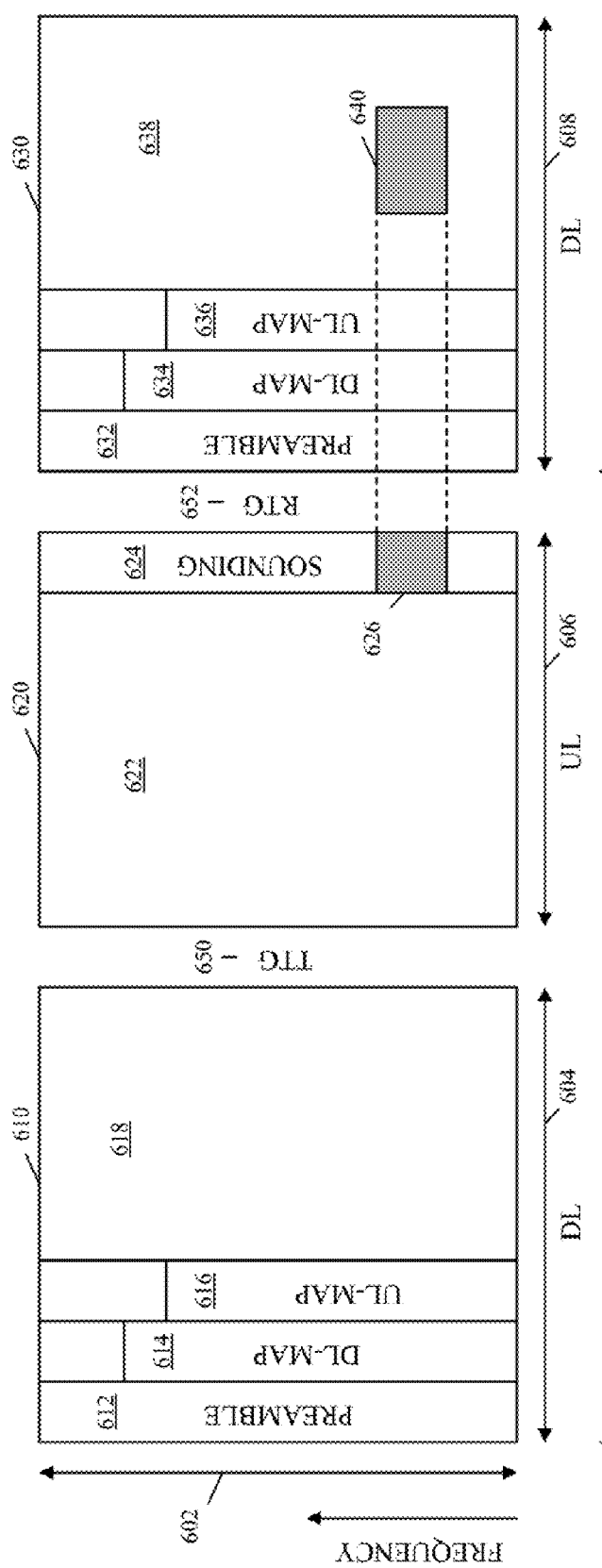
FIG. 6 is a block diagram of exemplary uplink and downlink sub-frames employed by an Orthogonal Frequency Division Multiple Access communication system.

For example, in one embodiment of the present invention and as noted above, the channel quality-related uplink signal may be a known uplink signal, such as a sounding signal, that is transmitted by UE 102 over designated sub-carriers of the frequency bandwidth and via first antenna 216, and measured by RAN 110. For example and referring now to FIG. 6, a block diagram 600 is provided that depicts a transmission of a sounding signal in a sounding zone in accordance with an embodiment of the present invention. More particularly, FIG. 6 depicts multiple exemplary sub-frames. During a first Transmission Time Interval (TTI) (also known as a sub-frame) 604 a RAN 110 transmits a first downlink (DL) sub-frame 610. During a next, second TTI 606, UE 102 transmits an uplink (UL) sub-frame 620 to the RAN, and during a next, third TTI 608 the RAN transmits a second DL sub-frame 630. Between each sub-frame is a transition time interval, or gap, 650, 652. More particularly, between DL sub-frame 610 and UL sub-frame 620 is a Transmit Transition Gap (TTG) 650 and between UL sub-frame 620 and DL sub-frame 630 is a Receive Transition Gap (RTG) 652. During these gaps, UE 102 and RAN 110 are not transmitting and are changing from a transmit or a receive mode to a receive or a transmit mode.

Each DL sub-frame 610, 630 includes a DL scheduling field (DL-MAP) 614, 634, an UL scheduling field (UL-MAP) 616, 636, and a DL data packet field 618, 638. Each DL sub-frame 610, 630 further may include a preamble field 612, 632. DL scheduling field 614, 634 provides a frame duration, a frame number, a DL sub-band allocation for DL bursts, and a coding and modulation scheme used for each DL burst. UL scheduling field 616, 636 provides UL sub-band scheduling for UL bursts, a coding and modulation scheme used for each UL burst, and a start time for each UL burst. DL data packet field 618, 638 comprises the DL bursts, that is, is the field in which the RAN transmits data packets to the served UEs based on the sub-band scheduling and the determined beamforming weights. Preamble field 612, 632 typically comprises pilots that may be used by UE 102 for timing synchronization, frequency synchronization, and channel estimation.

UL sub-frame 620 includes an UL data packet field 622 and a sounding zone 624. UL data packet field 622 comprises UL bursts, that is, is the field in which UE 102 transmits data packets to RAN 110 based on UL scheduling field 616. Sounding zone 624 is a field in which UE 102 transmits, over the frequency carriers allocated to the UE, a predetermined OFDM symbol known to both the RAN and the UE. Channel sounding assumes a reciprocity of the UL and DL channels and also assumes the RAN has a means of accounting for any non-reciprocities that may exist in the RAN transceiver hardware. Based on the received symbol the RAN is then able to determine a RAN-to-UE channel response. For example, as depicted in FIG. 6, a UE may transmit an OFDM symbol, that is, a known waveform, to a serving RAN in sounding zone 624 of UL frame 620, during time interval 606, and over designated sub-carriers of the frequency bandwidth 602. Based in the received symbol, the RAN, and in particular an associated transceiver, is able to estimate a RAN-to-UE channel response, schedule a sub-band comprising a set of sub-carriers 626 for a downlink transmission to the UE, and determine a set of weights for beamforming the DL transmission to the UE over the scheduled set of sub-carriers. The RAN then conveys a DL burst 640 to the UE in a DL data packet field 638 of DL sub-frame 630, transmitted during the next time interval 608. The DL burst is transmitted over the scheduled set of sub-carriers and sub-band using the set of weights determined based on the received sounding zone symbol.

In other embodiments of the present invention, the first channel quality-related uplink signal may be one or more of multiple other forms of channel quality feedback that indicate a downlink signal quality as measured by UE 102 and that can be used by RAN 110, and in particular transceiver 120, to compute a set of weights for a DL transmission comprise. For example, one form of such channel quality feedback is direct channel feedback, described in the IEEE 802.16 standard, where the UE transmits an encoded waveform, and the encoded waveform conveys the channel response between each transmit antenna on the RAN and a receive antenna on the UE. By way of another example, another form of such channel quality feedback is covariance feedback, where the UE measures the RAN-to-UE channel response, computes a spatial covariance matrix, and transmits an encoded waveform, and the encoded waveform conveys the entries of the downlink spatial covariance matrix. By way of yet another example, another form of such channel quality feedback is eigenvector feedback, where the UE measures the RAN-to-UE channel response, computes a spatial covariance matrix, computes the eigenvectors of that spatial covariance matrix, and transmits an encoded waveform, and the encoded waveform conveys the entries of the eigenvectors of the downlink spatial covariance matrix. All of these embodiments involve the UE measuring the RAN-to-UE channel response and computing a characteristic of the RAN-to-UE channel response, where the characteristic of the RAN-to-UE channel response is the actual channel response (for direct channel feedback), the spatial covariance matrix (for covariance feedback), or the eigenvectors of the spatial covariance matrix (for eigenvector feedback). The UE then transmits back a channel quality feedback signal comprising an encoded waveform (rather than a sounding symbol). Additionally, other forms of feedback that involve feedback transmissions from the UE are also possible and are within scope of the present invention. Examples of other forms of feedback are channel quality indicator (CQI) feedback, MIMO rank feedback, Carrier-to-interference-plus-noise-ratio (CINR) feedback, preferred modulation and coding strategy (MCS) feedback, channel condition feedback, and other related forms of feedback that are oriented towards adapting the data rate and modulation scheme strategy of the RAN-to-UE link.

Referring again to logic flow diagram 500, based on the received first channel quality-related uplink signal, RAN 110, and in particular transceiver 120, estimates (512) a first RAN-to-UE channel response using techniques known in the art. Based on the estimated first channel response, RAN 110, and in particular scheduler 136, schedules (514) a sub-band comprising multiple sub-carriers for use by the UE. Also, based on the first estimated channel response, RAN 110, and in particular transceiver 120, determines (516) a first set of antenna weights for DL transmissions to the UE over the scheduled sub-band. RAN 110, and in particular transceiver 120, then conveys (518) one or more DL data bursts in the DL data packet field(s) of one or more DL sub-frames, using the first set of weights as applied by weighter 310. In addition, UE 102 transmits (520) one or more UL data bursts in the UL data packet field(s) of one or more UL sub-frames via only first antenna 216.

Subsequent to selecting first antenna 216 for UL transmissions, UE 102 intermittently measures (522) a signal quality of DL transmissions, for example, pilot signals, from RAN 110 using each of the multiple antennas 216, 218 of antenna array 214. That is, UE 102 receives a signal from the RAN at each of the multiple antennas 216 and 218 and measures a quality of the signal received at each of the multiple antennas, again such as a received signal strength, a CINR, an SNR, a BER, an FER, and so on. At some point in time, based on the measured signal qualities, UE 102 determines (524) to switch antennas for UL transmissions from first antenna 216 to a second antenna of antenna array 214, that is, antenna 218.

In response to determining to switch antennas, UE 102 further determines (526) to transmit, via second antenna 218, a second channel quality-related uplink signal in a second uplink sub-frame during a second frame. The second channel quality-related uplink signal is associated with second antenna 218 and provides an indication of a condition of uplink 108 as between the second antenna and RAN 110. However, after switching to first antenna 216 for transmission of the first channel quality-related uplink signal, UE 102 continues to transmit (528) uplink signals via first antenna 216 until an occurrence of a switching time period that is restricted to one or more of a transition gap immediately preceding the second uplink sub-frame and a time period subsequent to the occurrence of the transition gap but prior to the transmission of the second channel quality-related uplink signal in the second uplink sub-frame. UE 102 then switches (530) to the second antenna 218 during the switching time period and transmits (532) via second antenna 218 and during the second uplink sub-frame, and RAN 110 receives (534), the second channel quality-related uplink signal during the second uplink sub-frame. The first and second UL sub-frames need not be consecutive UL sub-frames, as multiple frames may pass, in time, between the first and second sub-frames.

Based on the received second channel quality-related uplink signal, RAN 110, and in particular transceiver 120, updates the estimated channel response, that is, estimates (536) a second RAN-to-UE channel response using techniques known in the art. Based on the estimated second channel response, RAN 110, and in particular scheduler 136, schedules (538) a sub-band comprising multiple sub-carriers for use by the UE. Also, based on the second estimated channel response, RAN 110, and in particular transceiver 120, updates the antenna weights, that is, determines (540) a second set of antenna weights for DL transmissions to the UE over the scheduled sub-band. RAN 110, and in particular transceiver 120, then conveys (542) one or more DL data bursts in the DL data packet field(s) of one or more DL sub-frames, using the first set of weights as applied by weighter 310. In addition, UE 102 transmits (544) one or more UL data bursts in the UL data packet field(s) of one or more UL sub-frames via only the second antenna 218. Logic flow 400 then ends (546).

Figure 7:
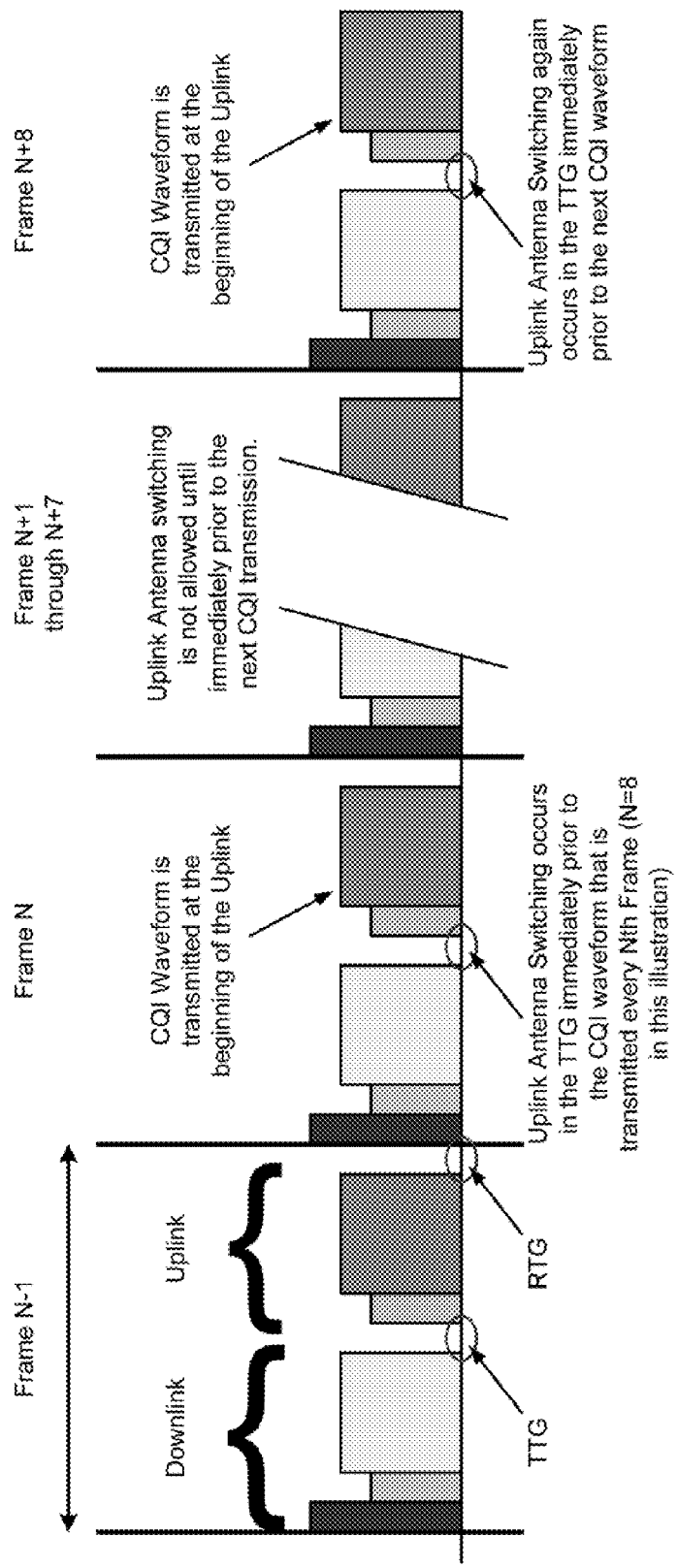
FIG. 7 depicts an exemplary antenna switching scenario in accordance with an embodiment of the present invention.

For example, FIG. 7 depicts an exemplary antenna switching scenario 700 in accordance with an embodiment of the present invention. As depicted in FIG. 7, a UE, such as UE 102, is scheduled to transmit a CQI waveform, or message, every Nth frame, for example, every eighth frame. UL antenna switching by the UE is therefore restricted to a switching time period, such as a TTG, immediately preceding or partially including the UL sub-frame that includes the CQI waveform or message. That is, if the UE transmits the CQI waveform or message in Frame 'N', then the UE may switch UL antennas during the TTG immediately preceding the UL sub-frame of Frame N. The UE then is not permitted to again switch UL antennas until the TTG immediately preceding the UL sub-frame that includes the next CQI waveform or message, that is, the UL sub-frame of Frame 'N+8.' That is, the UE is not permitted to switch UL antennas during Frame 'N+1' through Frame 'N+7.' Thus, as depicted in FIG. 7, seven frames may pass by, in time, between first using a first antenna of multiple UE antennas for UL transmissions and then switching to a second antenna of the multiple UE antennas for UL transmissions.

Figure 8:
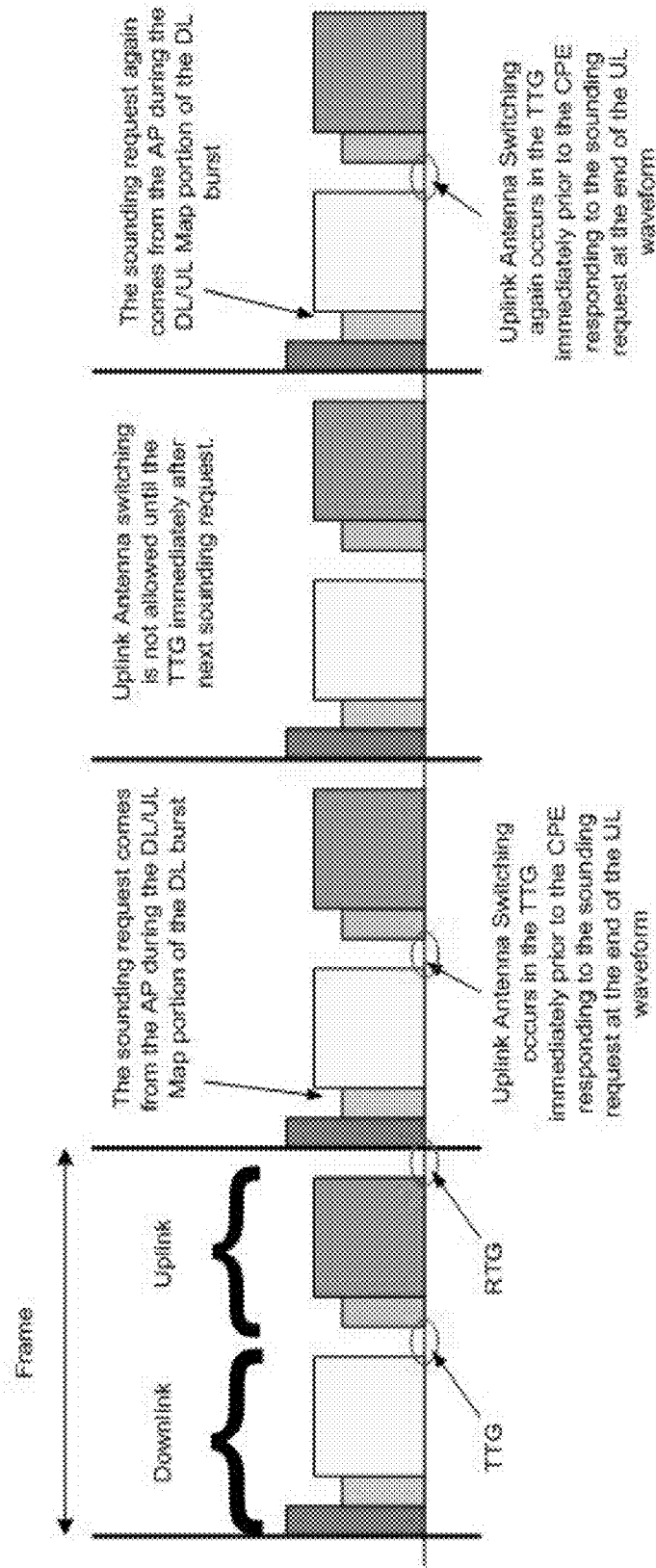
FIG. 8 depicts an exemplary antenna switching scenario in accordance with another embodiment of the present invention.

By way of another example, FIG. 8 depicts an exemplary antenna switching scenario 800 in accordance with another embodiment of the present invention. As depicted in FIG. 8, a UE, such as UE 102, is scheduled to transmit a sounding signal in response to receiving a sounding request from a serving RAN, such as RAN 110 and in particular transceiver 120. UL antenna switching by the UE is therefore restricted to a switching time period, such as a TTG, immediately preceding the UL sub-frame that includes the sounding signal. That is, if the UE transmits the sounding signal in a Frame 'N', then the UE may switch UL antennas during the TTG immediately preceding the UL sub-frame of Frame N. The UE then is not permitted to again switch UL antennas until the TTG immediately preceding the UL sub-frame that includes the next sounding signal. Thus, as depicted in FIG. 8, one or more frames may pass by, in time, between first using a first antenna of multiple UE antennas for UL transmissions and then switching to a second antenna of the multiple UE antennas for UL transmissions.

By restricting switching among the multiple antennas of a customer's wireless communication device to switching time periods that comprise one or more of a transition gap immediately preceding a transmission of a channel quality-related uplink signal and a time period subsequent to the occurrence of the transition gap but prior to the transmission of the channel quality-related uplink signal, which channel quality-related uplink signal may be used by a serving radio access network to update a channel response and antenna array weights associated with the customer's wireless communication device, communication system 100 better assures that such switching does not disrupt, and cause to be sub-optimal, beamforming at a serving RAN.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing uplink transmit diversity in a switched antenna Orthogonal Frequency Division Multiplexing communication system, the method comprising:
   restricting the switching of antennas for use by a customer's wireless communication device to transmit an uplink signal to switching time periods comprising one or more of a transition gap immediately preceding a transmission of a channel quality-related uplink signal and a time period subsequent to an occurrence of the transition gap but prior to the transmission of the channel quality-related uplink signal, which transmission channel quality-related uplink signal may be used by a serving radio access network to update a channel response and antenna array weights associated with the customer's wireless communication device; and
   switching, by the customer's wireless communication device, from use of a first antenna of a plurality of antennas to use of a second antenna of the plurality of antennas for uplink transmissions only during the switching time periods.

2. The method of claim 1, wherein the channel quality-related uplink signal comprises one or more of a sounding signal and an indicator of a downlink signal quality measured by the customer's wireless communication device.

3. The method of claim 1, further comprising:
   selecting the first antenna for an uplink transmission;
   subsequent to selecting the first antenna, transmitting, via the first antenna, a first channel quality-related uplink signal in a first uplink sub-frame; and
   wherein switching comprises:
      determining to transmit, via the second antenna, a second channel quality-related uplink signal during a second uplink sub-frame; and
      switching to the second antenna during a one or more of a transition gap immediately preceding a transmission of the second channel quality-related uplink signal and a time period subsequent to the occurrence of the transition gap but prior to the transmission of the channel quality-related uplink signal.

4. The method of claim 3, further comprising, subsequent to selecting the first antenna, transmitting uplink data bursts using only the first antenna until switching to the second antenna.

5. The method of claim 3, wherein a plurality of frames pass by, in time, between selecting the first antenna and switching to the second antenna.

6. The method of claim 3, further comprising:
   receiving, by a radio access network, the first channel quality-related uplink signal;
   estimating a channel response based on the first channel quality-related uplink signal; and
   determining a set of antenna weights for downlink transmission based on the estimated channel response.

7. The method of claim 6, wherein the channel response is a first channel response and the set of antenna weights is a first set of antenna weights and wherein the method further comprises:
   receiving, by the radio access network, the second channel quality-related uplink signal;
   estimating a second channel response based on the second channel quality-related uplink signal; and
   determining a second set of antenna weights for downlink transmission based on the estimated second channel response.

8. A customer's wireless communication device that is capable of operating in an Orthogonal Frequency Division Multiplexing communication system and that comprises:
   a plurality of antennas;
   a switching device coupled to the plurality of antennas; and
   a processor that is coupled to the switching device and that is configured to cause the switching device to switch from use of a first antenna of the plurality of antennas to use of a second antenna of the plurality of antennas for uplink transmissions only during switching time periods, wherein the switching time periods are restricted to time periods comprising one or more of a transition gap immediately preceding a transmission of a channel quality-related uplink signal and a time period subsequent to an occurrence of the transition gap but prior to the transmission of the channel quality-related uplink signal, which transmission channel quality-related uplink signal may be used by a serving radio access network to update a channel response and antenna array weights associated with the customer's wireless communication device.

9. The customer's wireless communication device of claim 8, wherein the channel quality-related uplink signal comprises one or more of a sounding signal and an indicator of a downlink signal quality measured by the customer's wireless communication device.

10. The customer's wireless communication device of claim 8, wherein the processor further is configured to select the first antenna for an uplink transmission and subsequent to selecting the first antenna, transmit, via the first antenna, a first channel quality-related uplink signal in a first uplink sub-frame, and wherein the processor is configured to cause the switching device to switch from use of the first antenna to use of the second antenna by determining to transmit, via the second antenna, a second channel quality-related uplink signal during a second uplink sub-frame and switch to the second antenna during a one or more of a transition gap immediately preceding a transmission of the second channel quality-related uplink signal and a time period subsequent to the occurrence of the transition gap but prior to the transmission of the channel quality-related uplink signal.

11. The customer's wireless communication device of claim 10, wherein the processor further is configured to, subsequent to selecting the first antenna, transmit uplink data bursts using only the first antenna until switching to the second antenna.

12. The customer's wireless communication device of claim 10, wherein a plurality of frames pass by, in time, between selecting the first antenna and switching to the second antenna.

13. A wireless communication system comprising the customer's wireless communication device of claim 10 and further comprising a network-based transceiver that is configured to receive the first channel quality-related uplink signal, estimate a channel response based on the first channel quality-related uplink signal, and determine a set of antenna weights for downlink transmission based on the estimated channel response.

14. A wireless communication system comprising the customer's wireless communication device of claim 10, wherein the channel response is a first channel response, wherein a set of antenna weights is a first set of antenna weights, and wherein the system further comprises a network-based transceiver that is configured to receive the second channel quality-related uplink signal, estimate a second channel response based on the second channel quality-related uplink signal, and determine a second set of antenna weights for downlink transmission based on the estimated second channel response.

* * * * *